Nov. 14, 1967   F. S. STANCLIFFE   3,352,588
BUMPER WITH IMPACT ATTACHMENT
Filed Oct. 20, 1965
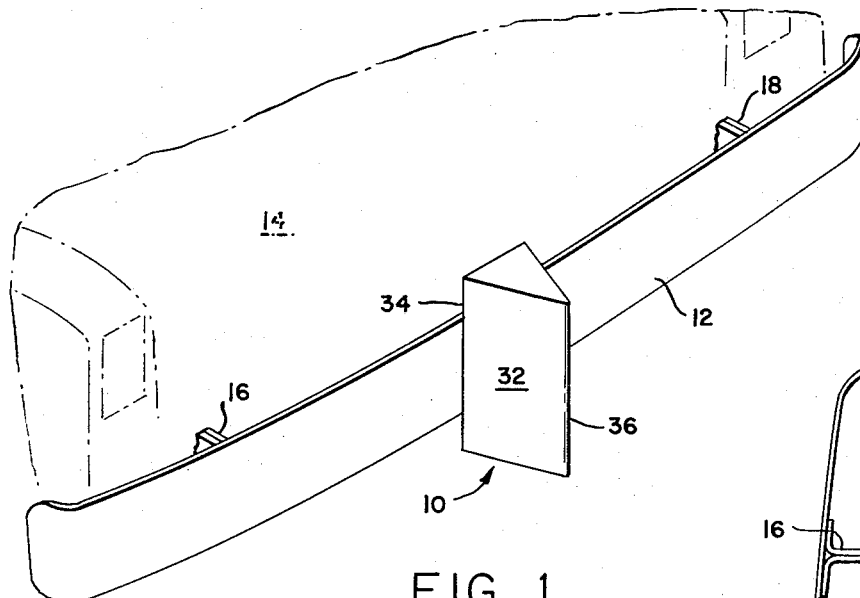
FIG_1
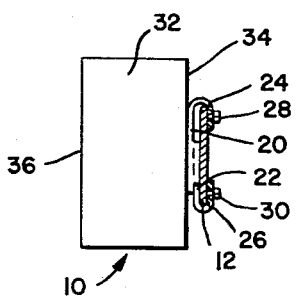
FIG_3
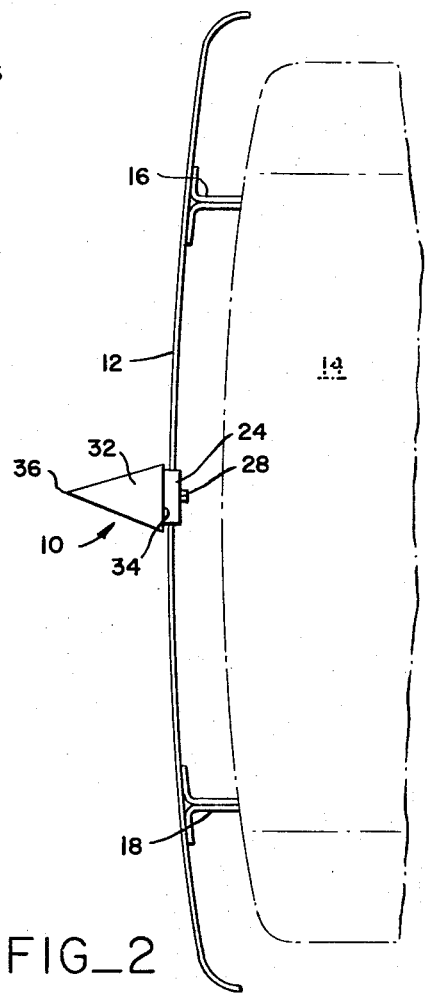
FIG_2
*INVENTOR.*
FLOYD S. STANCLIFFE
BY
Paul B. Fike
PATENT AGENT 3,352,588
BUMPER WITH IMPACT ATTACHMENT
Floyd S. Stancliffe, 5584 Sunny Oaks Drive,
San Jose, Calif. 95123
Filed Oct. 20, 1965, Ser. No. 498,483
3 Claims. (Cl. 293—65)

This invention relates to a bumper impact attachment and more particularly to a device attachable to the bumper of a vehicle for distributing impact forces upon collision with other objects so as to attain maximum shock absorption by the bumper.

Bumpers of motor vehicles should be shock-absorbing devices to minimize collision impact with other objects. Many bumpers currently used do very little to cushion impact transmitted to the vehicle. This collision shock causes injuries to the passengers within the vehicle as they are hurled against the vehicle interior or jarred in a manner so that whip-lash injuries can result. Bumpers customarily are mounted along the front and rear portions of a vehicle chassis by laterally spaced mounting members. Impact stress is transferred from the bumper to the vehicle chassis by these mounting members.

An object of the present invention is to provide a bumper attachment which will cause a bumper to absorb a portion of the impact shock upon collision with an object.

Another object of the invention is to provide a bumper attachment which will cause an object with which the attachment collides to absorb a portion of the shock of collision.

A further object of the invention is to provide a bumper attachment which may be applied without great difficulty to vehicles in present use.

Other objects and advantages of the invention will be apparent from the following detailed description, reference being made to the annexed drawing, in which:

FIG. 1 is a perspective view of a rear bumper mounted on a vehicle, a portion of which is shown in phantom line, with an impact attachment mounted thereon embodying the present invention, FIG. 2 is a top plan view of the bumper impact attachment shown in FIG. 1, FIG. 3 is a side elevational view of the bumper impact attachment shown in FIGS. 1 and 2.

With reference to FIG. 1, a bumper impact attachment 10 is mounted upon a horizontal bumper 12 of a vehicle 14. The bumper 12 is fixed to the vehicle by widely-spaced support members 16 and 18 while the attachment 10 is positioned on the bumper at a point substantially centered between the support members and on the opposite side therefrom. This attachment 10 is secured to the bumper 12 by clip members 20 and 22, as shown in FIG. 3, which are slidably interfitted and have hook portions 24 and 26, respectively, fitting over the upper and lower edges of the bumper. The clip members 20, 22 are locked in position on the bumper 12 by set screws 28 and 30 fitting through the respective hook portions 24 and 26. A wedge-shaped structure 32 having a base portion 34 is fixed to the clip member 20. This structure 32 extends outwardly from the bumper 12, as shown in FIGS. 1 and 2, and tapers from the base portion 34 to a vertical impact receiving edge 36. The wedge-shaped structure 32 can be either a solid member or one with a hollow interior and should extend substantially above and below the horizontal bumper 12 so as to contact engaging bumpers within a range of various elevations. The impact receiving edge 36 is spaced outwardly from the bumper 12 so as to receive the full impact force.

The bumper impact attachment 10 is installed by positioning it on the bumper 12 at a point substantially centered between the support members 16 and 18. Hook portion 24 of the clip member 20 fits over the upper portion of the bumper and interfitting clip member 22 is slid upwardly within clip member 20 so that hook portion 26 fits snugly about the lower edge of the bumper 12. Clip member 22 is secured in place by tightening set screw 30 which fits through the hook portion 26 and bears against the bumper 12. Clip member 20 is secured in place by tightening the set screw 28 which fits through the hook portion 24 and bears against the bumper 12. The bumper impact attachment 10 is thus locked in position on the horizontal bumper 12 of the vehicle 14 so as to protect it against the shock of collision impact.

Upon collision with an object, the vertical impact receiving edge 36 contacts the object and impact stress is transferred through the impact receiving member 10 to the bumper 12 at a point substantially centered between the support members 16 and 18. The bumper 12 deflects resiliently in beam-like fashion in response to the impact stress within the elastic limit of the bumper. Thus, a certain amount of impact stress is absorbed by the bumper 12 instead of being transferred through the support members 16, 18 to the vehicle 14. When the object with which the impact receiving edge collides is a bumper of another vehicle, that bumper will normally be supported laterally and centrally engage the impact attachment 10 so that it will also bend in a corresponding manner absorbing a further portion of the impact stress. Should the impact stress exceed the elastic limit of the bumper with which the impact receiving edge 36 collides, there will be a tendency for the bumper to deform about the wedge-shaped structure 32 and further cushion the shock transmitted to the vehicle 14. This tendency is due to the wedge-shape of the structure which concentrates the impact force so that the stress is greater along the impact receiving edge than at the base 34, thus causing deformation of the object with which it collides.

It will be understood that modifications and variations of the embodiments of the bumper impact attachment disclosed herein may be resorted to without departing from the spirit of the invention and the scope of the appended claims.

What is claimed is:
1. An attachment for a vehicle which comprises
   an elongated bumper adapted for mounting to the vehicle at spaced positions,
   means forming an impact-receiving edge spaced outwardly from said bumper, and
   rigid means connecting said impact-receiving edge to said bumper at a position substantially centered between said spaced bumper mounting positions so that substantially fixed spacing is maintained between said bumper and said impact receiving edge when the latter is engaged by an object and the impact force resultant from such engagement is transferred to said bumper near its center whereby said bumper will resiliently deflect in response to the transferred impact.

2. In combination with a bumper mounted at laterally spaced positions on a vehicle, a bumper impact attachment including:
   mounting means secured to said bumper between said laterally spaced positions, and
   a wedge-shaped structure having
   a base portion fixed to said mounting means,
   an impact receiving edge spaced outwardly from said base portion and extending transversely of said bumper between positions spaced substantially on opposite sides thereof, and
   rigid means connecting said impact-receiving edge to said base portion so that substantially fixed spacing is maintained between said bumper and said impact-receiving edge when the latter is engaged by an object and the impact force resultant from such engagement is transferred through said base portion to said bumper near its center whereby said bumper will resiliently deflect in response to the transferred impact.

3. In combination with a horizonal bumper mounted at laterally spaced positions on a vehicle, a bumper attachment including:

mounting means removably secured to said bumper at a point where maximum bumper deflection is obtained, and a wedge-shaped structure having a base portion fixed to said mounting means, a vertical impact receiving edge spaced outwardly from said base portion and extending between levels substantially above and below said horizontal bumper, and rigid means connecting said impact-receiving edge to said base portion so that substantially fixed spacing is maintained between said bumper and said impact-receiving edge when the latter is engaged by an object and the impact force resultant from such engagement is transferred through said base portion to said bumper near its center whereby said bumper will resiliently deflect in response to the transferred impact, said wedge-shaped structure tending to cause deformation of objects with which it collides.

References Cited

UNITED STATES PATENTS

| | | | |
|---|---|---|---|
| 1,362,195 | 12/1920 | Sills | 293—72 |
| 1,548,124 | 8/1925 | Dyer | 293—72 |
| 1,558,332 | 10/1925 | Basch | 293—71 |
| 1,658,764 | 2/1928 | Finn | 293—72 |
| 1,665,780 | 4/1928 | Hamburger | 293—71 |
| 2,069,548 | 2/1937 | Geddes | 293—67 |
| 2,173,642 | 9/1939 | Fageol | 293—71 |
| 2,182,085 | 12/1939 | Kellner | 293—67 |
| 2,730,396 | 1/1956 | Johnson | 293—71 |
| 2,731,289 | 1/1956 | Corydon | 293—71 |
| 3,310,330 | 3/1967 | Kressler | 293—67 |

ARTHUR L. LA POINT, *Primary Examiner.*

H. BELTRAN, *Assistant Examiner.*